United States Patent
Mir Shafiei et al.

(10) Patent No.: US 10,893,342 B2
(45) Date of Patent: Jan. 12, 2021

(54) RECONFIGURABLE OPTICAL MODULATOR

(71) Applicants: Mehrdad Mir Shafiei, Montreal (CA); Robert Brunner, Montreal (CA); Stephane Lessard, Mirabel (CA)

(72) Inventors: Mehrdad Mir Shafiei, Montreal (CA); Robert Brunner, Montreal (CA); Stephane Lessard, Mirabel (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 269 days.

(21) Appl. No.: 16/063,937

(22) PCT Filed: Feb. 1, 2016

(86) PCT No.: PCT/IB2016/050508
§ 371 (c)(1),
(2) Date: Jun. 19, 2018

(87) PCT Pub. No.: WO2017/134483
PCT Pub. Date: Aug. 10, 2017

(65) Prior Publication Data
US 2020/0275173 A1 Aug. 27, 2020

(51) Int. Cl.
*H04B 10/50* (2013.01)
*H04Q 11/00* (2006.01)
(Continued)

(52) U.S. Cl.
CPC ..... *H04Q 11/0005* (2013.01); *H04B 10/5053* (2013.01); *H04B 10/541* (2013.01);
(Continued)

(58) Field of Classification Search
None
See application file for complete search history.

(56) References Cited

U.S. PATENT DOCUMENTS

| 7,092,146 B2 * | 8/2006 | Kim | G02F 2/004 |
| | | | 359/326 |
| 7,555,216 B2 | 6/2009 | Yoshino et al. | |

(Continued)

FOREIGN PATENT DOCUMENTS

| EP | 1341333 A2 | 9/2003 |
| WO | 02/17517 A1 | 2/2002 |

(Continued)

OTHER PUBLICATIONS

Hood, D., Gigabit-capable Passive Optical Networks, 2012, John Wiley & Sons (Year: 2012).*

(Continued)

*Primary Examiner* — Jai M Lee
(74) *Attorney, Agent, or Firm* — Julie Dufort; Ericsson Canada Inc.

(57) ABSTRACT

There is provided a reconfigurable optical modulator comprising a light source and a splitter operative to receive an input signal from the light source and to split the input signal into a plurality of split signals. The optical modulator comprises a plurality of optical amplifiers, each being operative to receive one of the plurality of split signals as an input and to act as a switch having a first state where the split signal is blocked and a second state where the split signal is amplified. The optical modulator comprises a plurality of modulators, each being operative to receive an amplified split signal from one of the plurality of optical amplifiers and to modulate the amplified split signal into a modulated signal. The optical modulator comprises an optical combiner operative to combine a plurality of modulated signals produced by the plurality of modulators to thereby produce a modulated output signal.

14 Claims, 10 Drawing Sheets

(51) Int. Cl.
*H04B 10/54* (2013.01)
*H04B 10/556* (2013.01)

(52) U.S. Cl.
CPC ..... *H04B 10/5561* (2013.01); *H04Q 11/0062* (2013.01); *H04Q 2011/0015* (2013.01); *H04Q 2011/0081* (2013.01)

(56) References Cited

U.S. PATENT DOCUMENTS

| | | | | |
|---|---|---|---|---|
| 8,391,724 | B2* | 3/2013 | Aruga | H04B 10/5053 398/198 |
| 9,525,491 | B2* | 12/2016 | Cavaliere | H04B 10/5053 |
| 9,755,753 | B2* | 9/2017 | Blumenthal | H01S 5/14 |
| 10,498,454 | B1* | 12/2019 | Anderson | G02F 1/225 |
| 2003/0095737 | A1* | 5/2003 | Welch | G02B 6/12021 385/14 |
| 2005/0053385 | A1* | 3/2005 | Nishimura | G02F 2/004 398/188 |
| 2005/0069240 | A1* | 3/2005 | Griffin | H04B 10/505 385/3 |
| 2005/0129356 | A1* | 6/2005 | Matsumoto | G02F 2/004 385/27 |
| 2006/0093362 | A1* | 5/2006 | Welch | G02B 6/12026 398/87 |
| 2006/0222293 | A1* | 10/2006 | Ellis | H04B 10/508 385/27 |
| 2006/0263097 | A1* | 11/2006 | Akiyama | H04B 10/5051 398/188 |
| 2007/0116461 | A1* | 5/2007 | Chen | H04B 10/66 398/45 |
| 2010/0150559 | A1* | 6/2010 | Essiambre | H04J 14/06 398/79 |
| 2011/0076020 | A1* | 3/2011 | Nilsson | H04J 14/02 398/65 |
| 2011/0206384 | A1* | 8/2011 | Zhou | H04B 10/572 398/192 |
| 2013/0089333 | A1* | 4/2013 | Shen | H04B 10/506 398/79 |
| 2013/0101295 | A1* | 4/2013 | Dupuis | H04B 10/5051 398/79 |
| 2014/0126913 | A1* | 5/2014 | Nakamoto | H04B 10/50572 398/115 |
| 2014/0133868 | A1* | 5/2014 | Krause | H04B 10/5051 398/184 |
| 2015/0304051 | A1 | 10/2015 | Yuan et al. | |
| 2017/0033884 | A1* | 2/2017 | Sugiyama | H04J 14/06 |
| 2017/0222729 | A1* | 8/2017 | Sadot | H04B 10/548 |
| 2017/0244491 | A1* | 8/2017 | Hayashi | H04B 10/5053 |
| 2018/0299746 | A1* | 10/2018 | Morin | H01S 3/10046 |
| 2019/0146301 | A1* | 5/2019 | Mizrahi | G02F 1/225 385/3 |
| 2019/0339468 | A1* | 11/2019 | Evans | G02B 6/43 |

FOREIGN PATENT DOCUMENTS

| | | |
|---|---|---|
| WO | 2013/054086 A1 | 4/2013 |
| WO | 2013/056734 A1 | 4/2013 |

OTHER PUBLICATIONS

Lu et al., Reconfigurable multilevel transmitter using monolithically integrated quad Mach-Zehnder IQ modulator for optical 16-QAM and 8-PSK generation, 2011, OSA (Year: 2011).*

Guo-Wei Lu et al., Reconfigurable multilevel transmitter using monolithically integrated quad Mach-Zehnder IQ modulator for optical 16-QAM and 8-PSK generation, Mar. 14, 2011 / vol. 19, No. 6 / Optics Express, pp. 5596-5601.

Akihide Sang et al., 240-Gb/s Polarization-Multiplexed 64-QAM Modulation and Blind Detection Using PLC-LN Hybrid Integrated Modulator and Digital Coherent Receiver, ECOC 2009 (2009), 2 pages.

A.H. Gnauck et al., Optical Phase-Shift-Keyed Transmission, Journal of Lightwave Technology, vol. 23, No. 1, Jan. 2005, IEEE, pp. 115-130.

B. Thomas Smith et al., Fundamentals of Silicon Photonic Devices, Jul. 2011, 7 pages.

ISR and Written Opinion from corresponding application PCT/IB2016/050508.

* cited by examiner

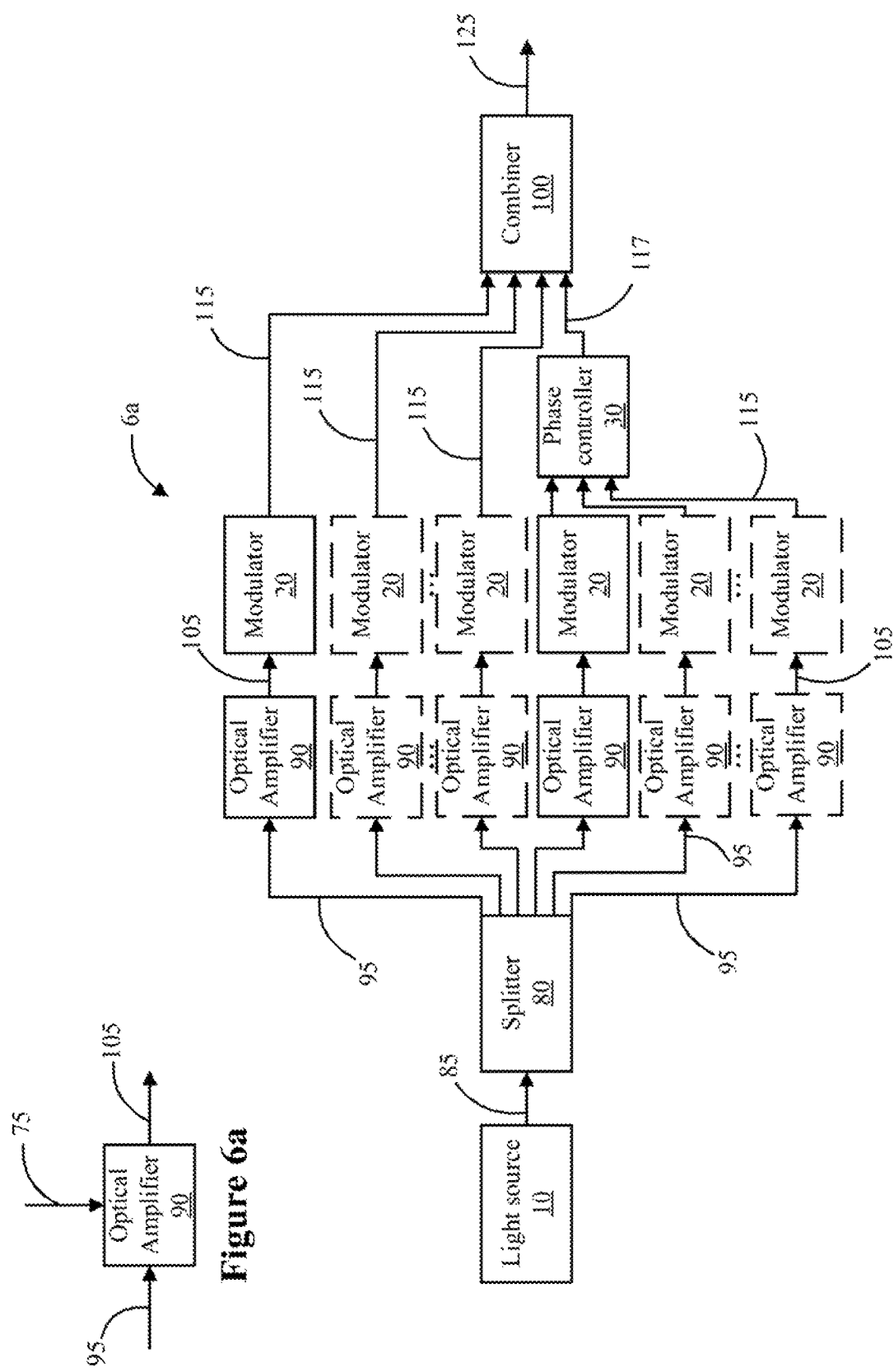

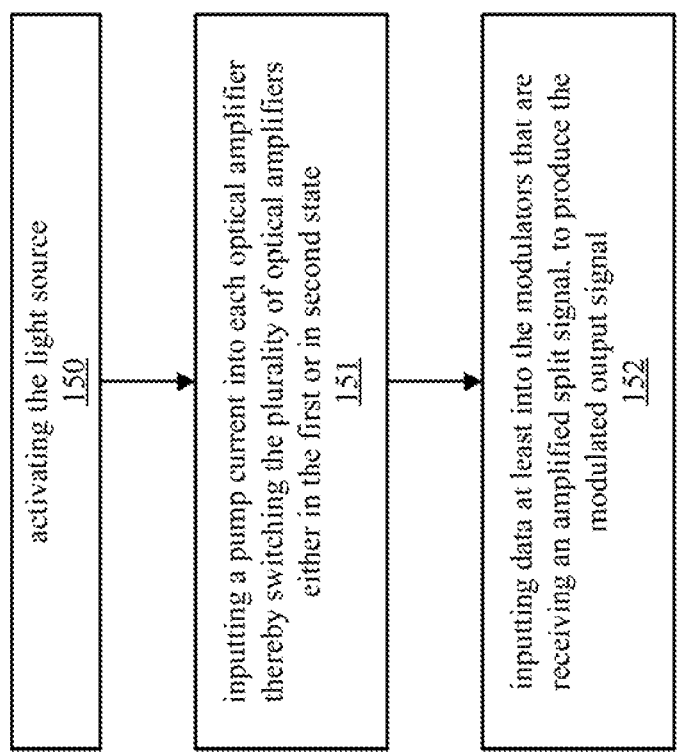

RECONFIGURABLE OPTICAL MODULATOR

TECHNICAL FIELD

The present disclosure relates to a reconfigurable optical modulator.

BACKGROUND

There has been a constant demand on increasing the capacity of optical networks in recent years, especially for video transmission on the internet and cloud applications.

Wavelength-division multiplexing allows for a linear increase in the capacity of an optical fiber, proportional to the number of wavelengths. Traditionally data is transmitted on a wavelength in on-off keying (OOK) format. Amplitude-Shift Keying (ASK) is another form of transmission where several amplitude levels of a carrier wave can represent more data on a wavelength.

Nowadays, however, the data is generally encoded in the optical phase, using higher-order modulation formats that increase the transmission capacity by enhancing the spectral efficiency.

Different formats exist for encoding data in the optical phase of a signal (which is called phase modulation). One format is Phase-Shift Keying (PSK). Because there is no such thing as a reference phase in optical receivers, the phase of the preceding bit is used as a relative phase reference, which results in Differential-Phase-Shift keying (DPSK).

Quadrature Amplitude Modulation (QAM) is another form of phase modulation in use nowadays. 16-QAM, for example, consists in the interferometric addition of two independent four-level amplitude-shift keying (4-ASK) mutually orthogonal and out of phase by 90°.

In order to achieve phase modulation such as DPSK or QAM, Mach-Zehnder Modulators (MZMs) can be used, as illustrated in FIG. 1, which shows a dual-parallel MZM (DPMZM) (1) to generate QAM modulation or Quadrature Phase-Shift Keying (QPSK). The DPMZM (1) uses a light source (10), two Mach-Zehnder Modulators (MZM) (20). In the DPMZM (1), the MZMs (20) are used for controlling the amplitude of the optical wave (5) and a phase controller (30) modulates the phase on one branch of the MZM generally rotating it by 90° (or π/2). The signals (15, 17) from both arms are then combined by quadrature addition, thereby generating a 16-QAM signal (25).

Higher-order modulation formats can be formed by using the DPMZM (1) in conjunction with multi-level electric signals generated by a digital-to-analog convertor (DAC).

An MZM (20) is illustrated in more details in FIG. 2 and its operation is now described. The MZM (20) is an interferometric device with two branches that converts binary electric data to optical data with speeds up to 40 Gigabits per second (Gb/s). An interferometric device generally splits an input beam into two separate beams, exposes at least one of the beams to some external influence, such as length change or refractive index change, for example, and recombines the beams, utilizing the effect of interference. Binary input data (35), which is the data to be transmitted on the wavelength carrier, is amplified by an electrical driver (40), and added to a Direct Current (DC) bias voltage (45). The resulting electric signal 50 is applied to a phase shifter (60) of the MZM (20). Complementary data, e.g. one arm gets the negative phase shift of the other arm, can be applied to the second phase shifter (60) of the MZM for chirp-free operation, where the output is only amplitude modulated with no phase modulation.

The transfer function of an MZM (2) can be expressed as:

$$P_{out} = P_{in} \cos^2\left(\frac{\pi}{2V_\pi}(V_{data} + V_{dc})\right)$$

In the above equation, $P_{out}$ is the output optical power, $P_{in}$ is the input optical power, $V_\pi$ is the voltage required to cause a π phase shift, $V_{data}$ is the data amplitude and $V_{dc}$ is the DC bias voltage.

It should be noted that for using an MZM (20) for OOK or ASK modulation, the MZM (20) is biased at its quadrature point (at the midpoint of the optical response curve of the MZM). For using the MZM (20) for PSK or phase modulation, the MZM (20) is biased at its transmission null.

FIG. 3 illustrates a reconfigurable modulator (3) capable of generating different modulation formats. In this reconfigurable modulator, a subset or all the MZMs (20-1 to 20-4) can be activated. If only MZMs 20-1 and 20-3 are activated, an offset 4-QAM modulation is obtained. If only MZMs 20-2 and 20-4 are activated, quadrature phase states in the complex plane are obtained i.e. Quadrature Phase-Shift Keying (QPSK). 16-QAM is obtained by activating all the MZMs (20-1 to 20-4).

Another scheme for 16-QAM signal generation is illustrated in FIG. 4. Two QPSK modulators (1) (FIG. 1) are placed inside a Mach-Zehnder interferometer (MZI) (4) with one branch having an attenuator (31) inducing an extra 6 dB optical power loss.

SUMMARY

There is provided a reconfigurable optical modulator (6, 7, 8), comprising a light source (10) and a splitter (80) operative to receive an input signal (85) from the light source (10) and to split the input signal (85) into a plurality of split signals (95). The optical modulator also comprises a plurality of optical amplifiers (90), each being operative to receive one of the plurality of split signals (95) as an input and to act as a switch having a first state where the split signal (95) is blocked and a second state where the split signal is amplified (105). The optical modulator further comprises a plurality of modulators (20), each being operative to receive an amplified split signal (105) from one of the plurality of optical amplifiers (90) and to modulate the amplified split signal (105) into a modulated signal (115). The optical modulator also comprises an optical combiner (100) operative to combine a plurality of modulated signals (115) produced by the plurality of modulators (20) to thereby produce a modulated output signal (125).

There is also provided a method for using the reconfigurable optical modulator described above, the method comprising the steps of activating the light source (150) and inputting a pump current into each optical amplifier thereby switching the plurality of optical amplifiers either in the first or in second state (151). The method also comprises the step of inputting data at least into the modulators that are receiving an amplified split signal, to produce the modulated output signal (152).

BRIEF DESCRIPTION OF THE DRAWINGS

FIG. 6a illustrates an optical amplifier and corresponding signals.

FIG. 6b illustrates a generic reconfigurable optical modulator according to an embodiment.

FIG. 12 is a flowchart of a method according to an embodiment.

DETAILED DESCRIPTION

Various features will now be described with reference to the figures. These various aspects are described hereafter in greater detail in connection with exemplary embodiments and examples, and should not be construed as limited to these embodiments. Rather, these embodiments are provided so that the disclosure will be thorough and complete.

In some figures, some blocks may be optional and/or some functions may or may not be executed; these are generally illustrated with dashed lines.

Higher-order modulation formats are generally produced in the electrical domain using complex and costly DAC. The limited frequency response of electrical amplifiers and the sampling speed of DAC limit achievable bit-rates.

Figure 3:
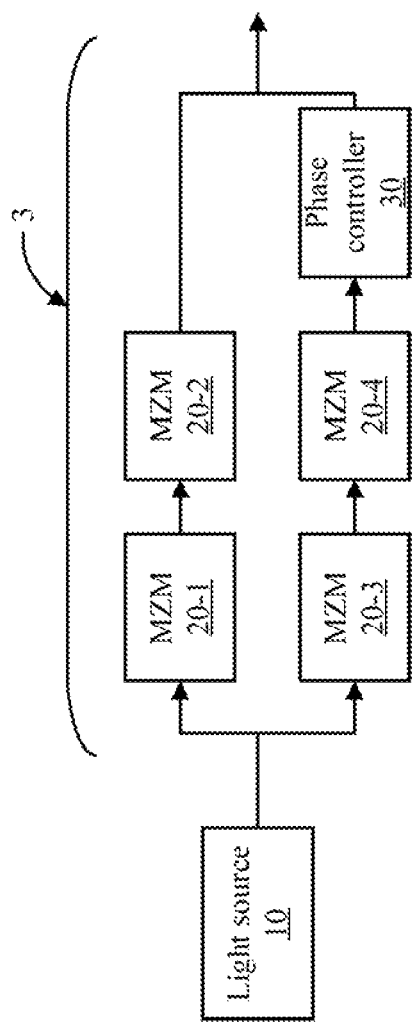
FIG. 3 illustrates a reconfigurable optical modulator according to the prior art.

Further, most solutions known today are not reconfigurable; the modulation format cannot be changed. Modulation reconfiguration is important to adapt the transmission data rate based on channel condition. A reconfigurable modulator is described in relation with FIG. 3, but it is limited to a few modulation formats. In addition, by splitting the input light into several branches, the available optical power is reduced in the reconfigurable modulator of FIG. 3.

Multiple embodiments of an optical transmitter with a new reconfigurable optical modulator that can achieve higher-order modulation formats are described in this disclosure. By using semiconductor optical amplifier (SOA) gates in a multi-branch modulator, the transmitter is capable of switching between various modulation formats, such as on-off keying (OOK), Amplitude-Shift Keying (ASK) or Pulse amplitude modulation (PAM), Differential-Phase-Shift keyed (DPSK), Quadrature Phase-Shift Keying (QPSK) and M-Quadrature Amplitude Modulation (M-QAM), where M can take different values, such as 4, 16, 64, 256, etc. The disclosure below describes how the transmitter is scalable and is configured by controlling the pump current of the SOAs.

A reconfigurable modulator that can compensate for optical power reduction is desirable to adapt to various channel conditions and to provide variable bit-rate, if required, in a dynamic network. The new reconfigurable modulator presented herein addresses the need for reconfigurable higher-order modulation formats in future dynamic optical networks. The proposed optical modulator can generate M-QAM signals from binary electrical data. Possible modulation formats are OOK/ASK, PAM-4, PAM-8, DPSK, QPSK and M-QAM where M=4, 16, 64, 256, etc. The number of symbols M in a given M-QAM can be calculated as a function of the number of bits/symbols, N, using the following formulas:

$Rb=Rs*N$ and $N=\log_2 M$, where Rb is the bit-rate and Rs is the symbol-rate.

Figure 1:
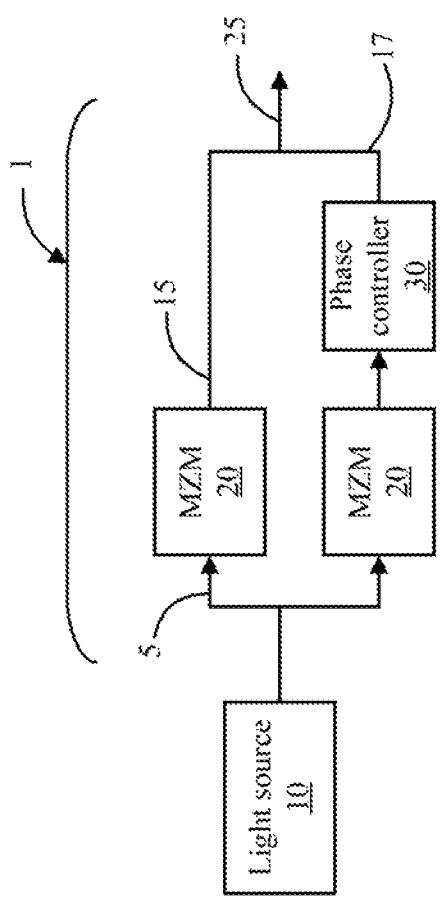
FIG. 1 illustrates a Quadrature Phase-Shift Keying (QPSK)/Quadrature Amplitude Modulation (QAM) modulator according to the prior art.
Figure 2:
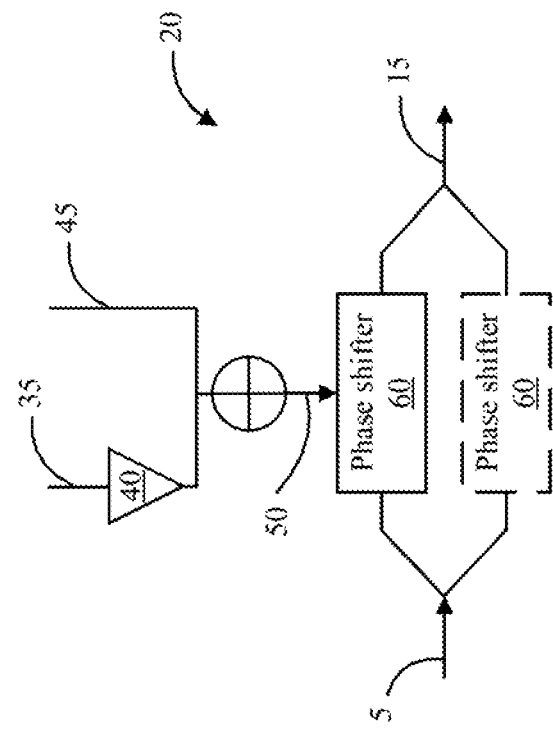
FIG. 2 illustrates a Mach-Zehnder Modulator (MZM) according to the prior art.
Figure 4:
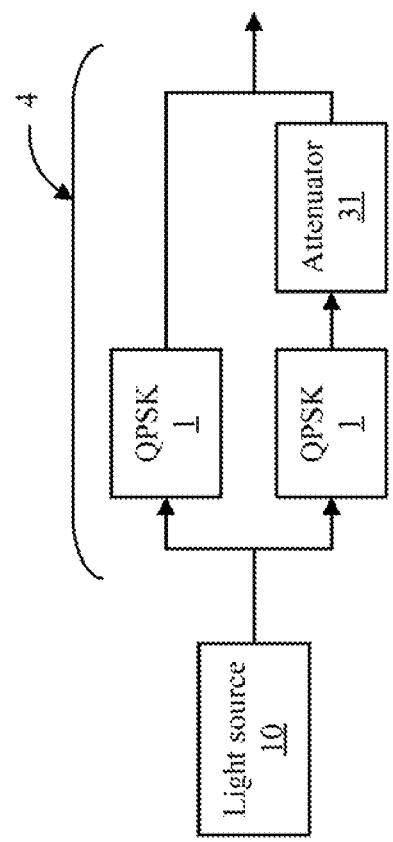
FIG. 4 illustrates a Mach-Zehnder interferometer (MZI) according to the prior art.

The optical modulators presented herein (except for the embodiments of FIGS. 10 and 11) comprise two arms; an upper arm and a lower arm, each having the same number of branches. The lower arm is characterized in that all branches input into either a phase controller (30) or a phase attenuator (31). For example, the optical modulators of the prior art shown in FIGS. 1, 3 and 4 each have two arms with only one branch in each i.e. an upper arm and a lower arm. The reconfigurable optical modulator of FIG. 7, for example, comprises two arms each having 4 branches; an upper arm comprising the branches comprising SOA 90-1 to 90-4 and a lower arm comprising the branches comprising SOA 90-5 to 90-8.

FIG. 5 shows several modulation constellation diagrams. FIG. 5a shows the DPSK format generated by a single MZM. FIG. 5b shows the 4-Amplitude shift keying (ASK) modulation format obtained by using two parallel MZMs. FIG. 5c shows an 8 level signal (PAM-8). FIG. 5d shows the QPSK or QAM modulation. FIG. 5e shows a 16-QAM modulation format.

FIG. 6b illustrates a reconfigurable optical modulator (6a), comprising a light source (10) connected to a splitter (80) operative to receive an input signal (85) from the light source (10) and to split the input signal (85) into a plurality of split signals (95). The splitter (80) is connected to a plurality of optical amplifiers (90). The plurality of optical amplifiers (90), are each operative to receive one of the plurality of split signals (95) as an input and to act as a switch having a first state where the split signal (95) is blocked and a second state where the split signal is amplified (105). The optical amplifiers (90) are connected to modulators (20). The plurality of modulators (20), are operative to receive an amplified split signal (105) from one of the plurality of optical amplifiers (90) and to modulate the amplified split signal (105) into a modulated signal (115). The modulators (20) are connected to a combiner (100). The optical combiner (100) is operative to combine a plurality of modulated signals (115) produced by the plurality of modulators (20) to thereby produce a modulated output signal (125).

The reconfigurable optical modulator (6a, 6b, 7a, 7b) of FIGS. 6b to 9, comprises a phase controller (30) operative to receive at least one modulated signal (115) from at least one of the plurality of modulators (20) and to produce a phase shifted modulated output signal (117) which is then combined with the modulated signals (115) by the optical combiner (100). The phase controller (30) can be a 90° phase shifter.

In the reconfigurable optical modulator (6, 7, 8) of all the embodiments, the light source (10) can be a laser operative to produce a continuously oscillating intensity of light.

Figure 7:
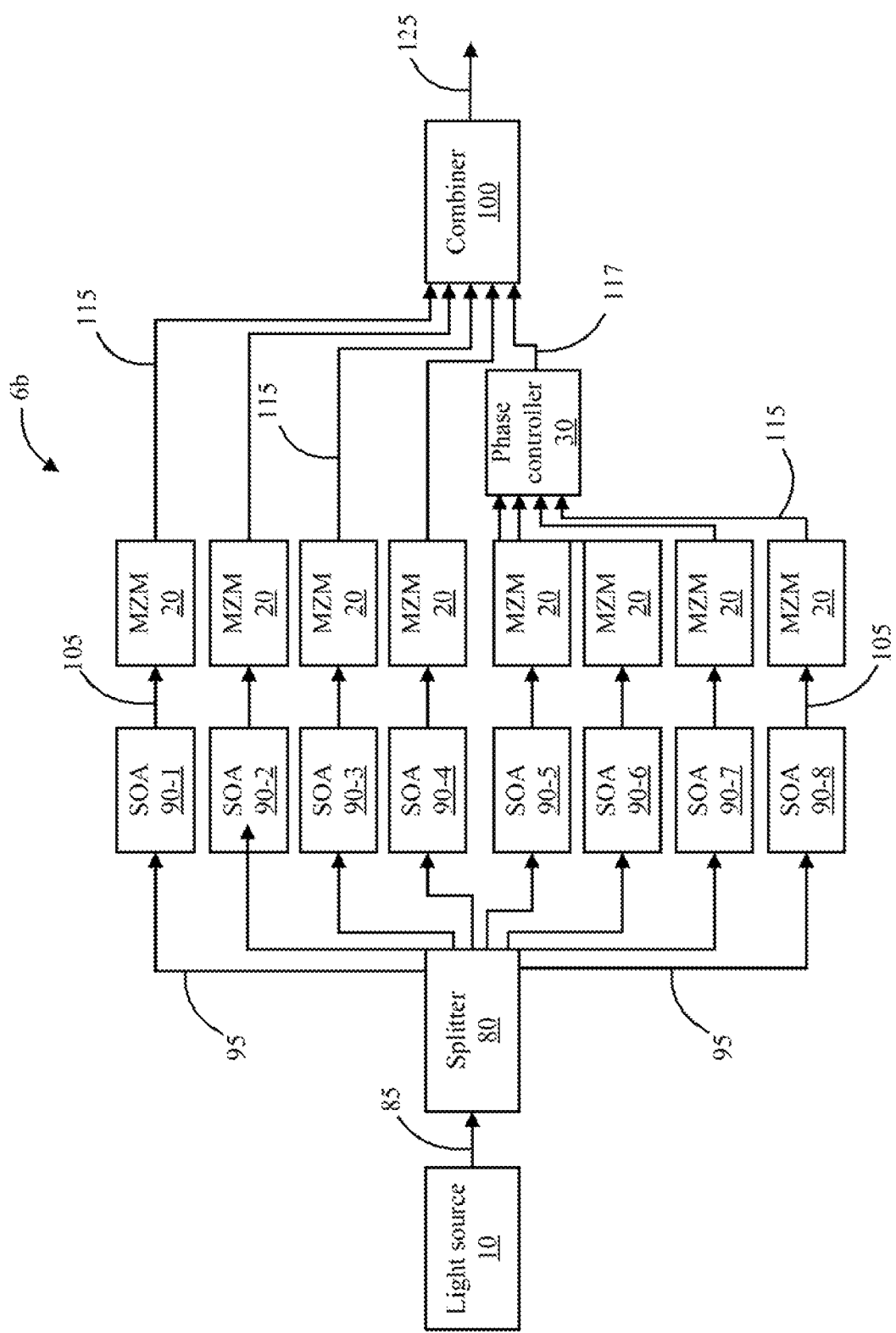
FIG. 7 illustrates an example reconfigurable optical modulator according to an embodiment.

The optical amplifiers (90) can be Semiconductor Optical Amplifiers, SOAs such as illustrated in FIG. 7. The semiconductor optical amplifiers (SOAs) are used to select a modulation format. As illustrated in FIG. 6a, each SOA (90) is operative to be controlled by a pump current (75) that can be set to achieve the first and second states. A large pump current adds gain to the circuit whereas absence of pump current absorbs light. Variations of the pump current change the level of amplification of the optical signal and a person skilled in the art would understand that the pump current can be varied according to the needs for a particular use of the reconfigurable optical modulator. Thus, a SOA can act like a switch that enables or eliminates one of the parallel branches of the modulator. When a large pump current is used, amplification of the split signal (95) is achieved.

The pump current (75) can therefore be variably adjusted, in the second state, to control a level of amplification of the split signal.

In FIG. 7, the splitter (80) divides the signal (85) from the light source (10) into several branches (95). The highest order of modulation depends on the number of branches available. A person skilled in the art would understand that even if only four branches are illustrated in the figures for each arm, there could be more branches. The splitter (80) can be made of a cascade of several Y-splitters or it can be made from a multi-mode interferometer (MMI), for example. The splitting ratio between branches can be chosen to be constant for simplicity but it can also be splitting asymmetrically with different power ratios.

Each branch features a semiconductor optical amplifier (90) followed by an MZM (20). The phase controller (30) receives the modulated signal (115) and produces a phase shifted modulated output signal (117). A combiner (100) is used to recombine the signals (115, 117) from all the branches to generate the output modulated (e.g. M-QAM) signal (125).

Each SOA (90) acts as a gate; it switches off the optical signal when the pump current is low and amplifies the optical signal when the pump current is high. The gain of an SOA (90) is controllable by adjusting the pump current.

Figure 5B:
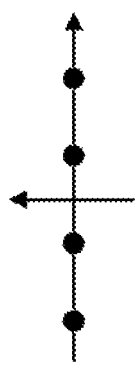
FIG. 5a-e illustrates several modulation constellation diagrams.
Figure 5A:
Figure 5C:
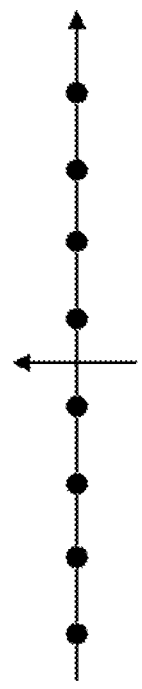
Figure 5E:
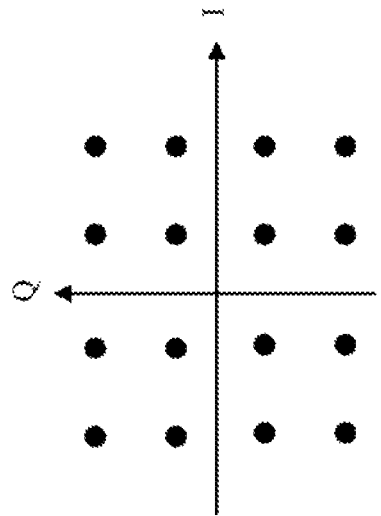
Figure 5D:
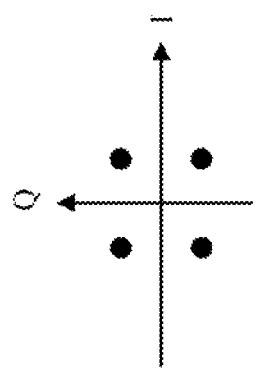

In FIG. 7 each SOA (90) can be operated at a specific gain to adjust the optical signal power in each branch according to the desired modulation scheme. For example, for obtaining 16-QAM modulation, the upper arm (composed of SOAs 90-1 to 90-4) should produce a 4-ASK signal (FIG. 5b). SOA 90-1 and SOA 90-2 are ON and SOA 90-3 and SOA 90-4 are OFF, with SOA 90-1 producing four times as much gain as SOA 90-2 (twice the amplitude gain). The MZM modulators (20) are biased at null.

Table 1 shows the status of the SOAs of FIG. 7 for each modulation format. The lower arm (composed of SOAs 90-5 to 90-8) follows the same pattern as the upper arm.

TABLE 1

| Modulation format | SOA status | | | |
|---|---|---|---|---|
| | SOA 90-1 and SOA 90-5 | SOA 90-2 and SOA 90-6 | SOA 90-3 and SOA 90-7 | SOA 90-4 and SOA 90-8 |
| QAM/QPSK | ON | OFF | OFF | OFF |
| 16-QAM | ON | ON | OFF | OFF |
| 64-QAM | ON | ON | ON | ON |

Figure 8:
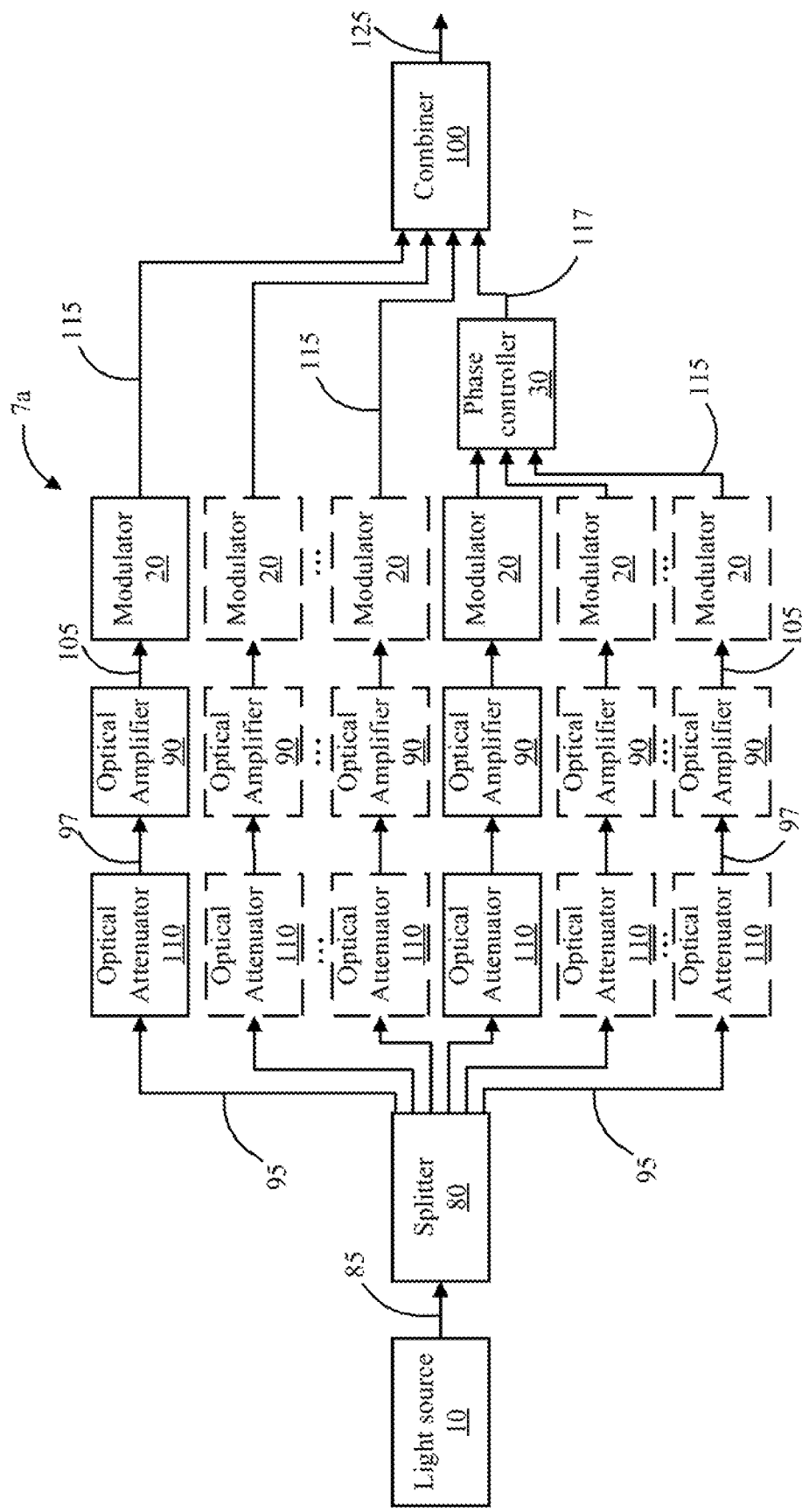
FIG. 8 illustrates a generic reconfigurable optical modulator according to another embodiment.
Figure 9:
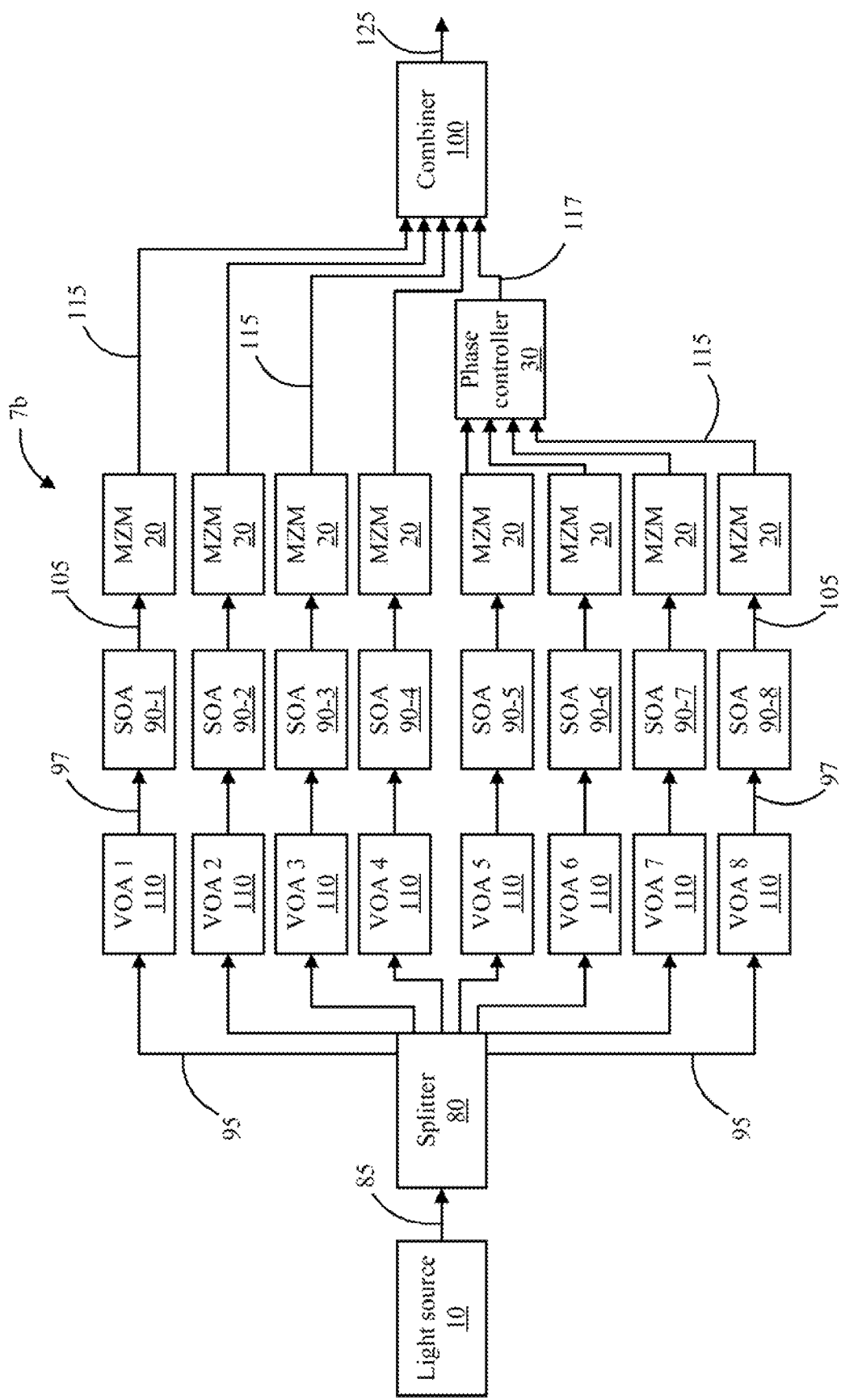
FIG. 9 illustrates an example reconfigurable optical modulator according to another embodiment.

The embodiment of FIG. 8 of the reconfigurable optical modulator (7a) comprises the same elements as those described in relation with the embodiment of FIG. 6. In addition, the reconfigurable optical modulator (7a) comprises a plurality of optical attenuators (110). The optical attenuators are connected to the splitter (80) on one side and to an optical amplifier (90) on the other side. Each optical attenuator (110) is operative to receive one of the plurality of split signals (95) as an input and to attenuate (97) the split signal. The optical attenuators (110) can be Variable Optical Attenuators, VOAs, as shown in FIG. 9, and can be controlled by an input current. Further, the input current can be variably adjusted to control a level of attenuation of the split signal.

The embodiment of FIG. 9 comprises the same elements as those described in relation with the embodiment of FIG. 7. In addition, the embodiment of FIG. 9 of the reconfigurable optical modulator (7b), comprises variable optical attenuators (VOAs) (110), placed in all branches. A variable optical attenuator (110) adjusts the intensity of light in each branch (95) depending on the target modulation format. In this embodiment the gain of the SOA (90) (when it is ON) can be constant for all modulation formats, while the VOAs can apply a variable loss thereby allowing providing signals with different amplifications on each branch. SOA noise depends on the pump level and a constant SOA gain results in more uniform constellation diagrams in terms of noise levels.

To obtain the PAM modulation format, the lower arm (comprising SOA 90-5 to SOA 90-8) can be turned off. With the embodiment of FIG. 7 or 9, all the upper arm modulators work in phase to produce OOK, PAM-4, PAM-8 or PAM-16 signals, such as defined in table 2.

TABLE 2

SOA status. SOA 90-5, 90-6, 90-7 and 90-8 are switched OFF.

| Modulation format | SOA 90-1 | SOA 90-2 | SOA 90-3 | SOA 90-4 |
|---|---|---|---|---|
| OOK/BPSK | ON | OFF | OFF | OFF |
| PAM-4 | ON | ON | OFF | OFF |
| PAM-8 | ON | ON | ON | OFF |
| PAM-16 | ON | ON | ON | ON |

In all the embodiments of the reconfigurable optical modulator (6, 7, 8) described above, the modulators (20) can be Mach-Zehnder Modulators, MZM, but other modulators, such as a person skilled in the art would know, could be alternatively used.

Figure 10:
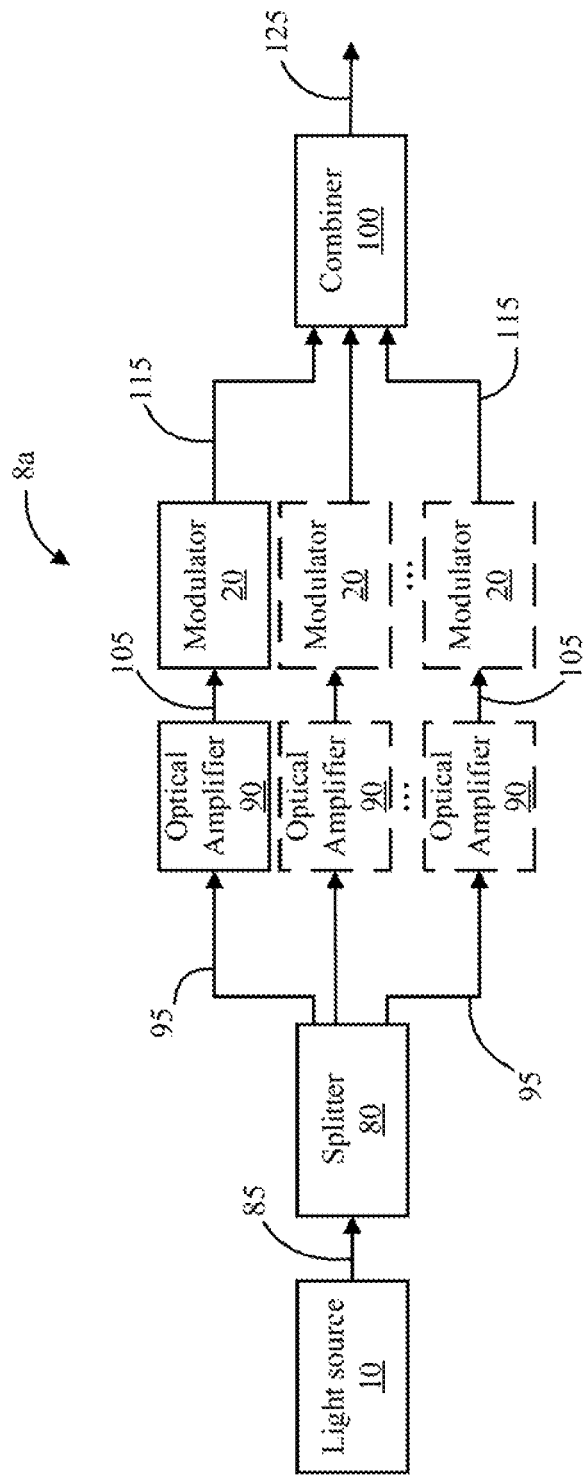
FIG. 10 illustrates a generic reconfigurable optical modulator according to another embodiment.

FIG. 10 illustrates a reconfigurable optical modulator (8a), comprising a light source (10) connected to a splitter (80) which is operative to receive an input signal (85) from the light source (10) and to split the input signal (85) into a plurality of split signals (95). The splitter (80) is connected to a plurality of optical amplifiers (90). The plurality of optical amplifiers (90), are each operative to receive one of the plurality of split signals (95) as an input and to act as a switch having a first state where the split signal (95) is blocked and a second state where the split signal is amplified (105). The optical amplifiers (90) are connected to modulators (20). The plurality of modulators (20), are each operative to receive an amplified split signal (105) from one of the plurality of optical amplifiers (90) and to modulate the amplified split signal (105) into a modulated signal (115). The modulators (20) are connected to a combiner (100). The optical combiner (100) is operative to combine a plurality of modulated signals (115) produced by the plurality of modulators (20) to thereby produce a modulated output signal (125). In this embodiment there is no phase controller (30) and therefore there is only one arm.

Figure 11:
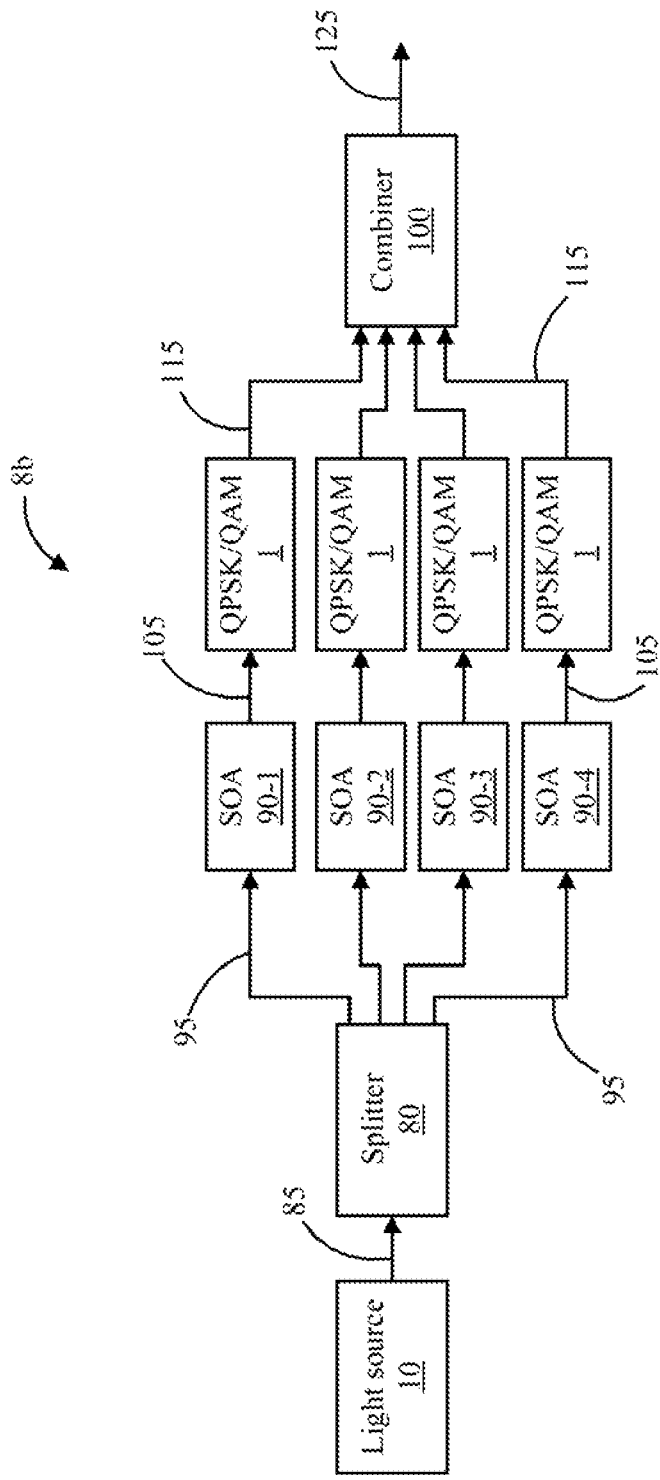
FIG. 11 illustrates an example reconfigurable optical modulator according to another embodiment.

In the embodiment of the reconfigurable optical modulator (8b) illustrated in FIG. 11, the modulators are Quadrature Phase-Shift Keying, QPSK, or Quadrature Amplitude Modulation (QAM) modulators (1).

In this embodiment, the SOAs (90) enable or disable each of the QPSK modulators. The SOAs (90) also adjusts the optical gain in each branch. Alternatively, VOAs, as described previously, could be used in a similar way as in the embodiment of FIG. 9. This embodiment of the reconfigurable optical modulator of FIG. 11 enables QAM, 16-QAM and 64-QAM and 256-QAM formats, such as shown in the table 3.

TABLE 3

| Modulation format | SOA status | | | |
|---|---|---|---|---|
| | SOA 90-1 | SOA 90-2 | SOA 90-3 | SOA 90-4 |
| QAM | ON | OFF | OFF | OFF |
| 16-QAM | ON | ON | OFF | OFF |
| 64-QAM | ON | ON | ON | OFF |
| 256-QAM | ON | ON | ON | ON |

In each embodiment presented above, of course, the modulators (20) are operative to receive input data (35) to be used to produce the modulated output signal (125). Input data (35) is the actual that is to be transmitted on the wavelength carrier.

FIG. 12 illustrates a method for using a reconfigurable optical modulator (6, 7, 8), such as described in the preceding embodiments, comprising the steps of activating the light source (150) and inputting a pump current into each optical amplifier thereby switching the plurality of optical amplifiers either in the first or in second state (151). The method also comprises the step of inputting data at least into the modulators that are receiving an amplified split signal, to produce the modulated output signal (152).

The embodiments described above propose a scalable and reconfigurable optical modulator that requires only binary electric data. In these embodiments, the modulation format can be selected by controlling the pump current of the SOAs. All the components can be fabricated on an integrated III/V chip (column III and V of the periodic table of elements), e.g. Indium Phosphide (InP), which can provide lower production costs as opposed to other types of components. Alternatively, all components except the SOAs can be fabricated on a silicon photonic die for a compact and low-cost solution. A chip containing the SOAs can subsequently be flip-chip bonded on the silicon die.

The structures shown in the embodiments described above are scalable by splitting the light source into more branches. It is worth noting, however, that high-order modulation formats are more susceptible to noise and need very high signal-to-noise ratios (SNR) for an error-free operation.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitations.

The invention claimed is:

1. A reconfigurable optical modulator (6, 7, 8), comprising:
a light source (10);
a splitter (80) operative to receive an input signal (85) from the light source (10) and to split the input signal (85) into a plurality of split signals (95);
a plurality of optical amplifiers (90), each being operative to receive one of the plurality of split signals (95) as an input and to act as a switch having a first state where the split signal (95) is blocked and a second state where the split signal is amplified (105);
a plurality of modulators (20), each being operative to receive an amplified split signal (105) from one of the plurality of optical amplifiers (90) and to modulate the amplified split signal (105) into a modulated signal (115);
an optical combiner (100) operative to combine a plurality of modulated signals (115) produced by the plurality of modulators (20) to thereby produce a modulated output signal (125); and
a phase controller (30) operative to receive at least one modulated signal (115) from at least one of the plurality of modulators (20) and to produce a phase shifted modulated output signal (117) which is then combined with the modulated signals (115) by the optical combiner (100).

2. The reconfigurable optical modulator (6, 7) of claim 1, wherein the phase controller (30) is a 90° phase shifter.

3. The reconfigurable optical modulator (6, 7, 8) of claim 1, wherein the light source (10) is a laser operative to produce a continuously oscillating intensity of light.

4. The reconfigurable optical modulator (6, 7, 8) of claim 1, wherein the optical amplifiers (90) are Semiconductor Optical Amplifiers, SOAs.

5. The reconfigurable optical modulator (6, 7, 8) of claim 4, wherein each SOA (90) is operative to be controlled by a pump current (75) that can be set to achieve the first and second states.

6. The reconfigurable optical modulator (6, 7, 8) of claim 5, wherein the pump current (75) can further be variably adjusted, in the second state, to control a level of amplification of the split signal (95).

7. The reconfigurable optical modulator (7) of claim 1, further comprising a plurality of optical attenuators (110), each being operative to receive one of the plurality of split signals (95) as an input and to attenuate (97) the split signal.

8. The reconfigurable optical modulator (7) of claim 7, wherein the plurality of optical attenuators (110) are Variable Optical Attenuators, VOAs.

9. The reconfigurable optical modulator (7) of claim 8, wherein each VOA (110) is operative to be controlled by an input current.

10. The reconfigurable optical modulator (7) of claim 9, wherein the input current can be variably adjusted to control a level of attenuation of the split signal.

11. The reconfigurable optical modulator (6, 7, 8) of claim 1, wherein the modulators (20) are Mach-Zehnder Modulators, MZM.

12. The reconfigurable optical modulator (8) of claim 1, wherein the modulators (20) are Quadrature Phase-Shift Keying, QPSK, or Quadrature Amplitude Modulation (QAM) modulators (1).

13. The reconfigurable optical modulator (6, 7, 8) of claim 1, wherein the modulators (20) are operative to receive input data (35) to be used to produce the modulated output signal.

14. A method for using a reconfigurable optical modulator (6, 7, 8) comprising:
- a light source (10);
- a splitter (80) operative to receive an input signal (85) from the light source (10) and to split the input signal (85) into a plurality of split signals (95);
- a plurality of optical amplifiers (90), each being operative to receive one of the plurality of split signals (95) as an input and to act as a switch having a first state where the split signal (95) is blocked and a second state where the split signal is amplified (105);
- a plurality of modulators (20), each being operative to receive an amplified split signal (105) from one of the plurality of optical amplifiers (90) and to modulate the amplified split signal (105) into a modulated signal (115); and
- an optical combiner (100) operative to combine a plurality of modulated signals (115) produced by the plurality of modulators (20) to thereby produce a modulated output signal (125), said method comprising the steps of:
- activating the light source (150);
- inputting a pump current into each optical amplifier thereby switching the plurality of optical amplifiers either in the first or in second state (151); and
- inputting data at least into the modulators that are receiving an amplified split signal, to produce the modulated output signal (152).

\* \* \* \* \*